(12) United States Patent
Kos

(10) Patent No.: US 6,656,415 B2
(45) Date of Patent: Dec. 2, 2003

(54) PROCESS AND DEVICE FOR PRECIPITATING COMPOUNDS FROM ZINC METAL BATHS BY MEANS OF A HOLLOW ROTARY BODY THAT CAN BE DRIVEN ABOUT AN AXIS AND IS DIPPED INTO THE MOLTEN ZINC

(75) Inventor: Bernd Kos, Leoben (AT)

(73) Assignee: Andritz Patentverwaltungsgesellschaft m.b.H., Graz (AT)

( * ) Notice: Subject to any disclaimer, the term of this patent is extended or adjusted under 35 U.S.C. 154(b) by 0 days.

(21) Appl. No.: 10/026,625

(22) Filed: Dec. 27, 2001

(65) Prior Publication Data

US 2002/0056951 A1 May 16, 2002

Related U.S. Application Data

(62) Division of application No. 09/402,465, filed as application No. PCT/AT99/00034 on Feb. 10, 1999, now Pat. No. 6,364,930.

(30) Foreign Application Priority Data

Feb. 11, 1998 (AT) ............................... A 1247/98

(51) Int. Cl.[7] ................................ C22B 7/04
(52) U.S. Cl. ........................ 266/205; 266/235
(58) Field of Search ................ 266/233, 235, 266/205, 239; 75/663

(56) References Cited

U.S. PATENT DOCUMENTS

| | | | |
|---|---|---|---|
| 392,455 A | * 11/1888 | Peck | 266/205 |
| 3,780,864 A | * 12/1973 | Dolgov et al. | 210/152 |
| 4,456,230 A | * 6/1984 | Menendez | 266/235 |
| 5,084,094 A | 1/1992 | Francois et al. | |
| 6,364,930 B1 | * 4/2002 | Kos | 75/663 |
| 2002/0056951 A1 | * 5/2002 | Kos | 266/235 |

FOREIGN PATENT DOCUMENTS

| | | |
|---|---|---|
| DE | 3734204 | 4/1989 |
| DE | 4000935 | 12/1990 |
| JP | 8-92664 | 4/1996 |
| JP | 408-239743 | * 9/1996 |
| JP | 9-13154 | 1/1997 |

OTHER PUBLICATIONS

Patent Abstracts of Japan, vol. 097, No. 001, Jan. 31, 1997 of JP 08 239743 A (Kawasaki Steel Corp.), Sep. 17, 1996.
Patent Abstracts of Japan, vol. 013, No. 011 (C–558), Jan. 11, 1989 of JP 63 219536 A (Kubota Ltd.), Sep. 13, 1988.
Patent Abstracts of Japan, vol. 095, No. 004, May 31, 1995 of JP 07 003414 A (Kawasaki Steel Corp.), Jan. 6, 1995.
Database WPI, Section Ch, Week 9410, Derwent Publications Ltd., London, GB: Class M24, AN 94–081021, XP002103401 & RU 2 002 832 C (Dyakov V.E.), Nov. 15, 1993.
Patent Abstracts of Japan, vol. 097, No. 018 (C–1167), Feb. 17, 1994 of JP 05 295506 A (NKK Corp.), Nov. 9, 1993.
Patent Abstracts of Japan of JP 09 013154 A (Kawasaki Steel Corp.), Jan. 14, 1997.
Patent Abstracts of Japan, vol. 097, No. 018 (C–1167), Feb. 17, 1994 of JP 05 295505 A (NKK Corp.), Nov. 9, 1993.
Patent Abstracts of Japan, vol. 076, No. 016 (C–914), Feb. 25, 1992 of JP 03 267357 A (NKK Corp.), Nov. 28, 1991.

* cited by examiner

Primary Examiner—Scott Kastler
(74) Attorney, Agent, or Firm—Greenblum & Bernstein, P.L.C.

(57) ABSTRACT

Process and device for precipitating solid compounds from zinc metal baths. Partial amounts of the metal phase containing these compounds are exposed to an acceleration higher than gravity and dissociated into fractions containing heavier or lighter components. The molten mass depleted of solid compounds is returned to the metal bath. The device has a hollow rotary body for introduction into the molten mass and provided with a discharge opening for the depleted molten mass and a discharge opening for the liquid metal enriched with the solid compounds.

19 Claims, 2 Drawing Sheets

PROCESS AND DEVICE FOR PRECIPITATING COMPOUNDS FROM ZINC METAL BATHS BY MEANS OF A HOLLOW ROTARY BODY THAT CAN BE DRIVEN ABOUT AN AXIS AND IS DIPPED INTO THE MOLTEN ZINC

CROSS-REFERENCE TO RELATED APPLICATIONS

The present application is a divisional of U.S. application Ser. No. 09/402,465, filed Feb. 10, 1999, now U.S. Pat. No. 6,364,930 which is hereby incorporated by reference in its entirety and which is a National Stage application of PCT/AT99/00034, filed Feb. 10, 1999, which was not published in English under PCT Article 21(2). The present application claims priority under 35 U.S.C. §119 of Austrian Patent Application No. 247/98, filed Feb. 11, 1998.

BACKGROUND OF THE INVENTION

1. Field of the Invention

The present invention relates to a process for precipitating solid compounds from the liquid zinc or liquid zinc-based alloys of a metal bath thereof.

The invention further relates to a device for precipitating solid compounds from a molten mass of liquid zinc or liquid zinc-based alloys, in particular from a metal bath thereof, for example, a galvanizing bath.

Finally, the invention relates to the use of the process and the use of the device for precipitating compounds and oxides, particularly intermetallic iron compounds from galvanizing baths, in particular from continuous sheet galvanizing systems.

2. Discussion of Background Information

Zinc is a metal with a comparatively low melting point of 419.6° C. and has a standard electrode potential of −0.762 V, and is therefore baser than iron with −0.447 V. In addition, zinc is relatively stable towards oxygen, because a zinc oxide layer formed on a zinc surface protects the zinc from the attack by oxygen. Thus, if a steel part is coated with a zinc layer, the zinc acts as an anode, i.e., protects the iron from oxidation, with the formed zinc oxide preserving the zinc layer from further oxidation. Because long-term rust protection of iron and steel can be achieved by zinc and zinc has a melting point that is lower by more than 1100° C., galvanizing parts in a liquid zinc bath is one of the most important protective measures against atmospheric and similar corrosion of steel components.

Galvanizing the steel parts takes mostly place by dipping them into a bath with liquid zinc or a zinc-based alloy to form a coating. Sheet metal is passed through a zinc bath, for example, which allows to achieve a thin, uniform and perfectly smooth surface coating.

Good adhesion of the zinc layer is ensured due to the solubility of the zinc in the alpha (α)-mixed crystal of the iron of up to approximately 7.3 at. % at usual bath temperatures. On the other hand, iron is only slightly soluble in zinc at its melting temperature, with the three-phase equilibrium at 419.35° C. having an eutectic composition: zinc and 0.021 at. % or 0.018% by weight of iron. At higher temperatures of 530° C., for example, the solubility of iron in liquid zinc is 0.3 at. % or 0.25% by weight.

If iron is introduced into a galvanizing bath due to iron dust or the like adhering to the part as well as by system parts, then iron-zinc mixed crystals are formed, for example $FeZn_3$, $FeZn_7$, $Fe_3Zn_{10}$, $Fe_5Zn_{21}$. These FeZn mixed crystals may be heavier than pure zinc and enrich themselves at the bottom of quiescent liquid galvanizing baths as hard zinc or as so-called "dross" or "bottom dross."

In order to improve the quality of the galvanizing or the zinc layer formation, in particular on metal sheet metal which passes through the zinc bath at a high speed, aluminum can be added at an order of magnitude of 0.1 to 0.2% by weight to form an alloy with the zinc bath. In the given case, the "bottom dross" interacts, in terms of reaction kinetics, with the zinc molten mass that due to subsequent alloying contains aluminum, and iron-aluminum mixed crystals with a configuration of $Fe_2Al_{(5-x)}Zn_x$ and a specific weight of significantly less than $6 \times 10^3$ kg/m$^3$ are formed.

The mixed crystals, in particular the compounds $Fe_2Al_{(5-x)}Zn_x$ form a pulp in the galvanizing bath, and with a continuation of the galvanizing treatments and further introduction of iron into the bath the particles become larger, reach a diameter of over 30 μm and agglomerates, so-called clusters, are generated. These coarse compound particles in the galvanizing bath, which may be in the form of lumps, can cause surface defects or can adversely affect the surface quality of the coating, especially in the galvanization of smooth sheet metal bands, such as those for the automobile industry, for example.

In order to purify galvanizing baths contaminated with intermetallic compounds, it is necessary to render the bath quiescent with respect to bath currents, if possible, whereafter the layer enriched on the surface with the compounds is skimmed off. Performing this kind of purification in sedimentation basins has already been proposed.

The previously known purification processes all have the disadvantages of low efficiency, high expenditure, reduced economic efficiency, and production safety, as well as productivity of the system.

The object of the invention is to eliminate the deficiencies of previous precipitation methods and to disclose a process by means of which even with large throughput quantities an insignificantly low content of solid compounds can be maintained in galvanizing baths.

An additional object of the invention is to provide a device for the optionally continuous precipitation of solid compounds from galvanizing and zinc baths, which device does not impede production.

SUMMARY OF THE INVENTION

The object is attained in a process of the type recited at the outset by subjecting partial amounts of the liquid metal phase containing the compound(s) and being above the melting temperature of zinc to an acceleration higher than the acceleration due to gravity and causing an at least partial demixing into fractions containing heavier and/or lighter components, whereafter the molten mass depleted of solid compounds is returned to the metal bath or made available in purified form for such a bath, and the part of the molten mass enriched with the desired compounds is discharged and/or supplied to a further separation process.

The additional object of the invention is attained with a device according to the species in that a hollow rotary body that can be driven about an axis and has conveyor means, such as conveyor impellers or pump impellers, projecting into the cavity in the feed or lower portion is introduced at least partially into the molten mass, which hollow rotary body is provided in its discharge or upper portion with at least one discharge opening for the depleted molten mass, which opening is eccentrically arranged in the wall of said body and, subsequent thereto with respect to the discharge side, with at least one further centrally and/or eccentrically arranged discharge opening for the liquid metal enriched with compounds wherein at least one of the upper molten mass discharge openings in the hollow rotary body opens into a discharge area of a housing which at least partially surrounds the hollow rotary body, which housing area has at least one discharge channel for the enriched molten mass and, optionally, a further one for the depleted molten mass designed to return to the metal bath.

The advantages of purifying a galvanizing bath of intermetallic compounds achieved in such a way can essentially be seen in that with a high acceleration of the metal contaminated with compounds of different densities a high degree of demixing can be achieved and utilized. A rapid and highly effective separation or accumulation of solid suspended particles, in particular $Fe_2Al_{(5-x)}Zn_x$, in the center of a rotating molten mass, was surprising for the person skilled in the art because on the one hand the difference in the specific weights is to be considered as rather small and, on the other hand, the low particle size and especially the phase boundary tensions between the compound and the liquid metal counteract demixing. The further advantage according to the invention is that, as was found, larger intermetallic particles and particularly compound agglomerates, which can cause an especially large reduction in quality of the coating, can be concentrated and discharged fully and in a highly effective manner by high acceleration.

If in so doing the molten mass containing the compounds is subjected to a centrifugal acceleration of at least 1.2 times, preferably of at least 2.1 times, particularly of more than 10.1 times the acceleration due to gravity, an efficient purification effect can be achieved.

To achieve high productivity, it is advantageous for the precipitation of compounds to be conducted essentially continuously with continuous removal of partial amounts of contaminated molten mass from a zinc (alloy) bath of an iron galvanizing device, in particular of a steel sheet galvanizing system, with return of the depleted liquid metal to the bath.

The purification effect of the process can be increased further if before or during the demixing treatment by applying an increased acceleration on the metal phase containing the compounds said mixture is adjusted or heated or cooled to a treatment temperature to between 420° C. and 480° C., preferably to between 429° C. and 450° C. This results in establishing a low solubility of the compounds in liquid metal and thus a precipitation or growth of nuclei or particles of the intermetallic phase.

The advantages of a device according to the invention essentially consist in that by the conveyor means projecting into the cavity of the hollow rotary body through the feed side a throughput and an increase in pressure of the rotating molten mass therein can be achieved. Both the amount fed through and the pressure in the liquid metal are, as was found, important for precipitation kinetics and the concentration behavior of the solid compounds in the liquid metal when centrifugal acceleration is applied. Both the flow rate through the hollow rotary body as well as the pressure built up therein can be adjusted synergistically with respect to optimal precipitation criteria of intermetallic particles by the design of the conveyor means and by the size of the discharge openings.

If the device is put out of operation by turning off the drive and is lifted, the entire interior space runs dry so that it is available for re-use without further cleaning work.

The rotation of the contaminated metal molten mass induced by the conveyor means can be supported effectively, whereby the hollow rotary body can also be reduced in terms of its length, if the interior wall of the hollow rotary body comprises carrier or guide means promoting the rotational movement of the molten mass therein.

In this connection, a separate molten mass discharge is improved if the hollow rotary body has centrifugal sealing elements or similar sealing elements cooperating with the housing parts.

It is advantageous for the input speed of the rotating shaft of the hollow rotary body to be adjustable in order to adjust the optimal flow rate through the hollow rotary body and the pressure inside the hollow rotary body, which are important particularly for varying temperatures of the molten mass.

It has proven to be favorable for both reducing the heat removal and for draining the device of liquid metal if at least parts of the housing have heat insulation.

In one aspect, the present invention relates to a process for removing solid compounds from a molten metal bath, the molten metal selected from liquid zinc and liquid, zinc-based alloys. The process comprises subjecting the molten metal containing the solid compounds to an acceleration higher than the acceleration due to gravity, whereby at least partial demixing of the molten metal into fractions comprising at least one of heavier and lighter components is effected. A fraction enriched with the solid compounds is separated from a fraction depleted of the solid compounds and the molten metal depleted of the solid compounds is returned to the metal bath or used in a new bath. The molten metal enriched with the solid compounds is discharged and/or supplied to a further separation process.

In one embodiment the solid compounds comprise intermetallic compounds, metal oxides or both. The intermetallic compounds may comprise iron and zinc, or iron, zinc and aluminum.

According to another embodiment of the above process the acceleration higher than the acceleration due to gravity is centrifugal acceleration. This centrifugal acceleration may be at least 1.2 times, preferably at least 2.1 times, and more preferably more than 10.1 times the acceleration due to gravity.

In a further embodiment of the instant process the metal bath is a galvanizing bath; for example, the metal bath may be part of an iron galvanizing device, e.g., a steel sheet galvanizing system.

According to a still further embodiment the process is carried out continuously. For example, a portion of the metal bath is subjected to said acceleration and the fraction depleted of the solid compounds is returned to the metal bath.

In another embodiment the molten metal is subjected to said acceleration while at a temperature between 420° C. and 480° C., e.g., between 429° C. and 450° C.

The density of the fraction enriched with the solid compounds may be different from the density of the fraction depleted of the solid compounds. For example, the fraction enriched with the solid compounds may have a higher density than the fraction depleted of the solid compounds or the fraction enriched with the solid compounds may have a lower density than the fraction depleted of the solid compounds.

According to yet another embodiment the instant process is carried out with a device that includes a hollow rotary body rotatable about an axis thereof, the hollow rotary body comprising a wall, a lower feed portion and an upper discharge portion. A housing surrounds said hollow rotary body at least partially. The housing has a discharge area that includes at least one discharge channel. The device also includes a conveyor arranged at least partially into the molten metal and projecting into a cavity in the lower feed portion. Further included are at least one first discharge opening for the fraction depleted of the solid compounds, located in said upper discharge portion and arranged eccentrically in a wall of the hollow rotary body, and at least one second discharge opening for the fraction enriched with the solid compounds, the at least one second discharge opening being arranged centrally and/or eccentrically in the upper discharge portion of the hollow rotary body and after the at least one first discharge opening with respect to the direction of discharge. At least one of the first and second discharge openings opens into the discharge area of the housing.

In a further embodiment the fraction depleted of the solid compounds has a higher density than the fraction enriched with the solid compounds and the fraction depleted of the solid compounds is discharged through the at least one first discharge opening. According to a still further embodiment the fraction depleted of the solid compounds is returned to the molten metal via a discharge channel of the discharge area of the housing.

Another aspect of the present invention is a process for removing solid compounds from a molten metal derived from a metal bath and selected from liquid zinc and liquid, zinc-based alloys, wherein the molten metal containing the solid compounds is subjected to an acceleration higher than the acceleration due to gravity, thereby effecting at least partial demixing of the molten metal into a fraction enriched with the solid compounds and a fraction depleted of the solid compounds. The density of the fraction enriched with the solid compounds is different from the density of the fraction depleted of the solid compounds. The fraction enriched with the solid compounds is separated from the fraction depleted of the solid compounds, whereby molten metal depleted of the solid compounds for further use in a metal bath is obtained.

In a further aspect the present invention relates to a device for precipitating solid compounds from a molten mass composed of liquid zinc or liquid, zinc-based alloys. The device comprises a hollow rotary body, rotatable about an axis thereof, that includes a wall, a lower feed portion and an upper discharge portion. The device further comprises a housing which at least partially surrounds the hollow rotary body and has a discharge area that includes at least one discharge channel for molten mass depleted of solid compounds. Also included in the device is a conveyor that is arranged at least partially into the molten mass and projects into a cavity in the lower feed portion. The device further includes at least one first discharge opening for molten mass depleted of solid compounds, located in the upper discharge portion and eccentrically arranged in a wall of the hollow rotary body, and at least one second discharge opening for molten mass enriched with solid compounds, the second discharge opening being arranged centrally and/or eccentrically in the upper discharge portion of the hollow rotary body and after the first discharge opening with respect to the direction of discharge. At least one of the first and second discharge openings opens into the discharge area of the housing.

In one embodiment the conveyor comprises conveyor impellers or pump impellers. According to another embodiment the interior wall of the hollow rotary body is designed to promote a rotational movement of the molten metal inside said hollow rotary body. For example, the interior wall may have carrier or guide elements.

In further embodiments of the device the hollow rotary body additionally has centrifugal sealing elements which cooperate with the housing, and at least parts of the housing have heat insulation.

According to a still further embodiment the discharge area of the housing has discharge channels for both the first and second discharge openings, while in another embodiment the discharge channel for the first discharge opening is designed to return the molten mass depleted of solid compounds back to original molten mass.

Another embodiment of the device includes a hollow rotary body that has a rotating shaft. The input speed of the rotating shaft may be adjustable.

In a further embodiment the discharge area of the housing also includes at least one discharge channel adapted for discharging the molten mass enriched with solid compounds.

BRIEF DESCRIPTION OF THE DRAWINGS

The invention is explained in more detail by the following drawings which each show just one embodiment.

In the drawings.

Figure 1:
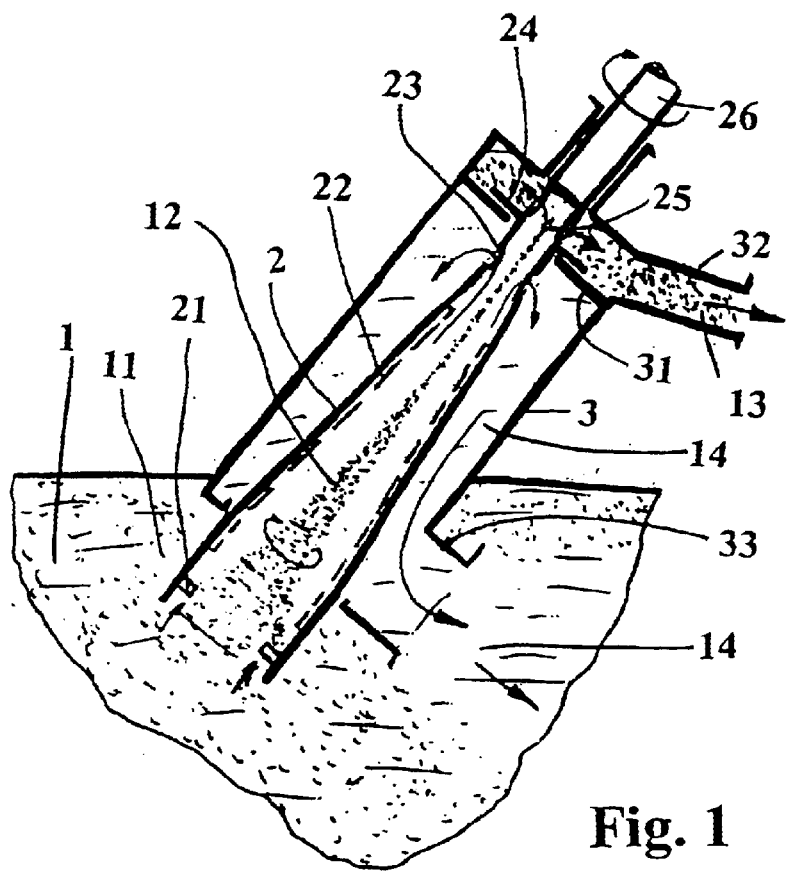
FIG. 1 is a precipitating device having a conical hollow rotary body.

The list of reference signs of the systematic representations is as follows:

1 molten mass
11 molten mass contaminated with compounds
12 enriched molten mass
13 compound concentrate
14 depleted molten mass
2 hollow rotary body
21 conveyor means or conveyor impeller, pump impeller
22 carrier or guide means
23 discharge opening for depleted molten mass
24 rotary sealing means
25 discharge opening for enriched molten mass
26 rotating shaft
3 housing
31 sealing means
32 discharge channel for enriched molten mass
33 discharge channel for depleted molten mass
34 insulation

DETAILED DESCRIPTION OF THE PRESENT INVENTION

FIG. 1 shows a schematic view of a hollow rotary body 2 partially dipped, at an angle, into a galvanizing bath 1, which hollow rotary body is partially enclosed by a housing 3. The hollow rotary body 1 experiences a rotational movement around its longitudinal axis when driven by means of a rotating shaft 26, while the conveyor means 21 projecting into the cavity introduce the molten mass 11 contaminated with compounds into the cavity until it is filled. The conveyor means 21 can be designed as slanted conveyor impellers or pump impellers or similarly acting parts. The molten mass 11 contaminated with particles which is introduced into the hollow rotary body 2 is set into rotation by a coaxial movement of the conveyor means 21 and/or by any optionally provided carrier or guide means 22 so that radial acceleration is effective in the molten mass. For example, some compounds such as, e.g., oxides or oxide layers and iron-aluminum-zinc mixed crystals, have a lower density than a liquid zinc-based alloy and, as a result, are thrust in the direction of the axis due to the acceleration effect, thereby creating a concentration of solid particles, i.e., an enrichment 12 in the liquid metal, in the axis area of the cavity, whereas depleted molten mass is present in the areas of the wall of the hollow rotary body 2. The conveyor means 21 and the optional carrier means 22 effect, with rotation of the hollow body 2, constant introduction of the contaminated molten mass 11 into said hollow body with induction of a rotary movement of the molten mass therein, as well as a disintegration with the formation of a portion of molten mass that is enriched with compounds 12 and a portion that is depleted of compounds. The hollow body 2 has eccentric discharge openings 23 in its upper portion, through which the depleted molten mass 14 collected on the hollow body wall is discharged, returned inside the housing 3, and can be removed by means of a discharge element 33. The molten mass enriched with compounds 12 remains in the axis area and is pushed further upwards due to the build-up of hydrostatic pressure of the conveyor means 21. The uppermost part of the hollow rotary body 2 has other discharge openings 25 in its wall, through which the enriched molten mass 12, forming a compound concentrate, can be discharged into a housing part with a discharge channel 32 for said concentrate 13. The areas formed in the housing 3 for the enriched molten mass 12, 13 and the depleted molten mass 14 can be sealed by means of sealing means 31 which cooperate with the rotary sealing means 24 of the hollow rotary body 2. With respect to the maximum effectiveness of the precipitation of compounds from the metal molten mass 1, it is advantageous to coordinate the rotational speed as well as a conicity of the hollow rotary body 2, a design of the conveyor means 21 and the size and shape of the cross-sections of the discharge openings 23, 25 synergistically with one another.

Figure 2:
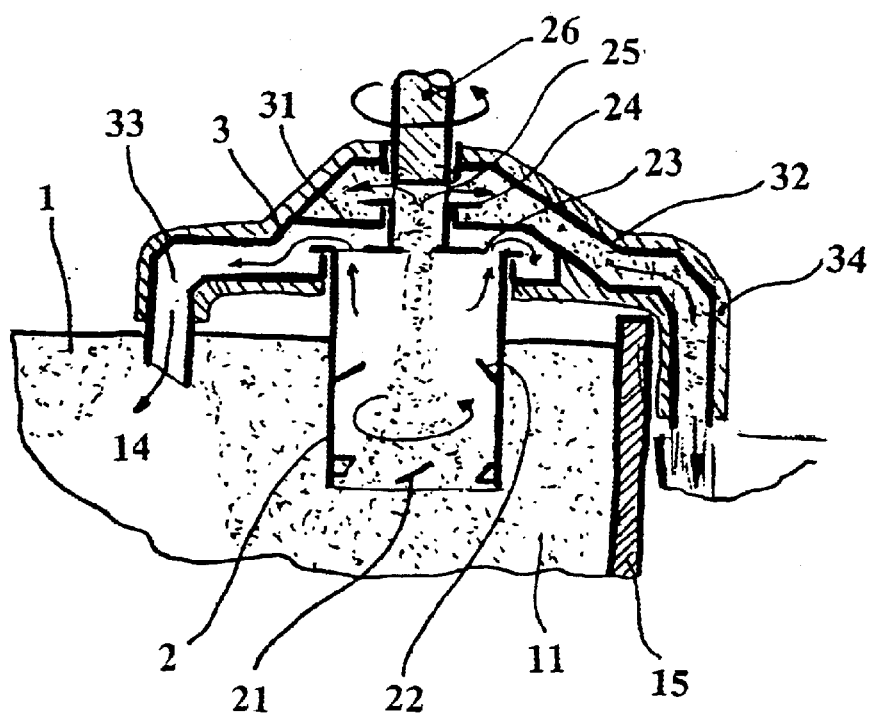
FIG. 2 is a precipitating device with a cylindrical hollow rotary body and two molten mass discharge channels.

FIG. 2 depicts another embodiment of a device according to the invention. An essentially cylindrical hollow rotary body 2 is enclosed in the upper portion by a housing 3 having an insulation 34 of the outer surface. Discharge openings 23 in the hollow body 2 for the depleted molten mass 14 are arranged on the outside front face and, on the other hand, a feed hollow is positioned centrically on the front face and the discharge openings 25 for the enriched molten mass are positioned subsequently on the surface of a partially hollow drive shaft 26. A rotary sealing means 24 and a sealing means 31 connected with the housing 3, which cooperate, form a separation of the respective discharge channels for the metal molten mass enriched with solid compounds 32 and the depleted metal molten mass 14.

Figure 3:
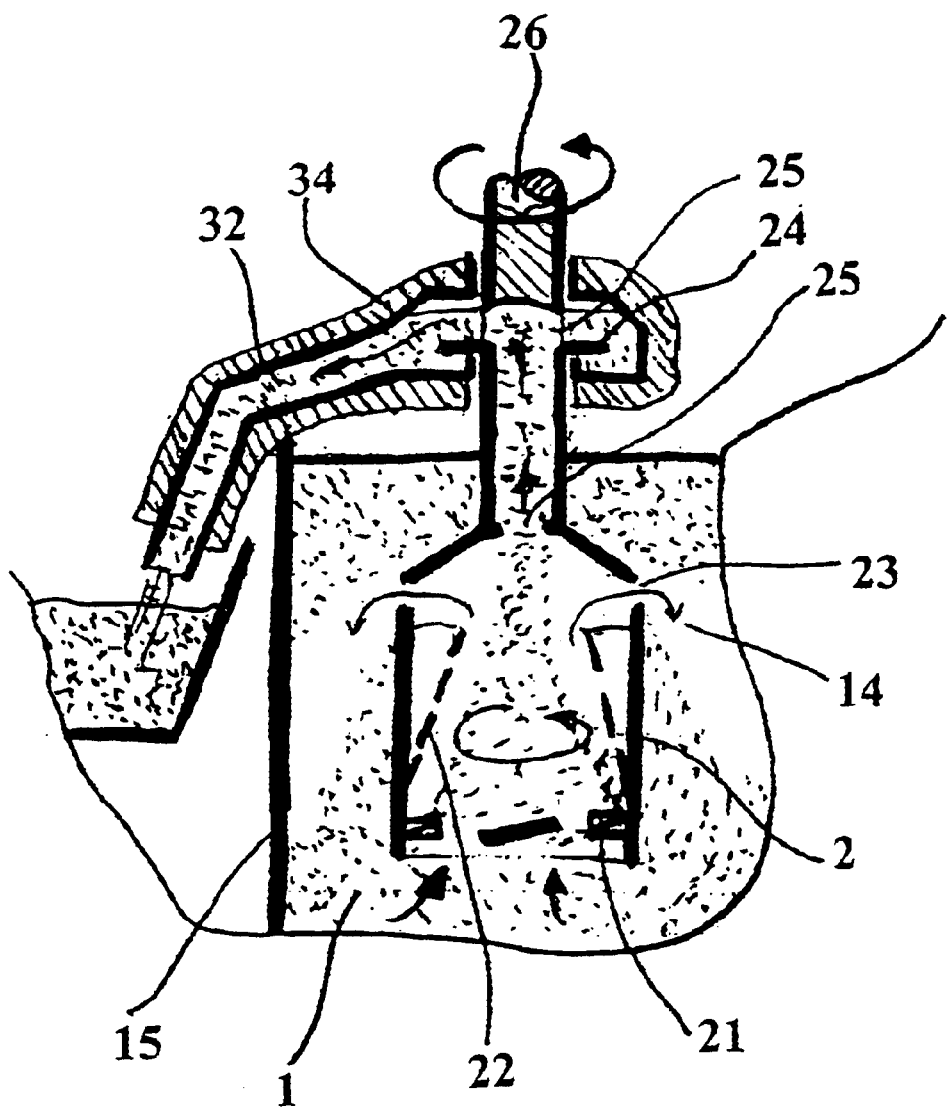
FIG. 3 is a precipitating device with direct return of the depleted molten mass into the metal bath.

FIG. 3 shows a schematic view of a cylindrical hollow rotary body 2 submerged essentially completely in the metal molten mass, such that the depleted molten mass 14 can be returned directly to the metal bath or galvanizing bath 1 through discharge openings 23 on the jacket side. An outlet 25 arranged centrically upward as well as subsequent discharge openings 24 arranged in a partially hollow rotating shaft or drive shaft 26 enable a discharge of the enriched molten mass 12 in a housing 3 reduced to a discharge channel 32 with a sealing system 24 and an insulation 34.

All devices according to the invention have the advantage that the hollow rotary body 2 and the channels 32, 33 can be run dry after the rotary drive has been turned off and they have been lifted out of the galvanizing bath, thereby rendering cleaning work unnecessary. However, heating devices and/or cooling devices for molten mass treatment can be provided in a favorable manner during implementation of the process and/or for complete cleaning of the device.

What is claimed is:

1. A device for precipitating solid compounds from a molten mass composed of one of liquid zinc and liquid, zinc-based alloys, comprising:

a hollow rotary body rotatable about an axis thereof, said hollow rotary body comprising a wall, a lower feed portion and an upper discharge portion, a conveyor capable of being arranged at least partially into the molten mass and projecting into a cavity in the lower feed portion, at least one first discharge opening for molten mass depleted of solid compounds, said at least one first discharge opening being located in said upper discharge portion and eccentrically arranged in a wall of the hollow rotary body, at least one second discharge opening for molten mass enriched with solid compounds, said at least one second discharge opening being arranged at least one of centrally and eccentrically in the upper discharge portion of the hollow rotary body and after the at least one first discharge opening with respect to the direction of discharge, a housing which at least partially surrounds said hollow rotary body, having a discharge area, said discharge area including at least one discharge channel for molten mass depleted of solid compounds;

at least one of the first and second discharge openings opening into the discharge area of said housing.

2. The device of claim 1, wherein said conveyor comprises conveyor impellers.

3. The device of claim 1, wherein said conveyor comprises pump impellers.

4. The device of claim 1, wherein an interior wall of the hollow rotary body is designed to promote a rotational movement of the molten metal inside said hollow rotary body.

5. The device of claim 4, wherein the interior wall has carrier or guide elements.

6. The device of claim 1, wherein the hollow rotary body additionally has centrifugal sealing elements which cooperate with the housing.

7. The device of claim 6, wherein at least parts of the housing have heat insulation.

8. The device of claim 1, wherein the discharge area of the housing has discharge channels for both said first and second discharge openings.

9. The device of claim 8, wherein the discharge channel for the first discharge opening is designed to return the molten mass depleted of solid compounds back to original molten mass.

10. The device of claim 1, wherein hollow rotary body additionally comprises a rotating shaft.

11. The device of claim 10, wherein the input speed of the rotating shaft is adjustable.

12. The device of claim 1, wherein said discharge area further includes at least one discharge channel adapted for discharging the molten mass enriched with solid compounds.

13. The device of claim 1, wherein an interior wall of the hollow rotary body has carrier or guide elements which promote a rotational movement of the molten mass inside the hollow rotary body, wherein the hollow rotary body additionally has centrifugal sealing elements which cooperate with the housing, wherein at least parts of the housing have heat insulation, and wherein the hollow rotary body additionally comprises a rotating shaft.

14. A device for precipitating solid compounds from a molten mass composed of one of liquid zinc and liquid, zinc-based alloys, comprising:

a hollow rotary body rotatable about an axis thereof, said hollow rotary body comprising a wall, a lower feed portion, an upper discharge portion and a rotating shaft of adjustable input speed, wherein an interior wall of the hollow rotary body is designed to promote a rotational movement of the molten metal inside said hollow rotary body;

a conveyor capable of being arranged at least partially into the molten mass and projecting into a cavity in the lower feed portion, at least one first discharge opening for molten mass depleted of solid compounds, said at least one first discharge opening being located in said upper discharge portion and eccentrically arranged in a wall of the hollow rotary body, at least one second discharge opening for molten mass enriched with solid compounds, said at least one second discharge opening being arranged at least one of centrally and eccentrically in the upper discharge portion of the hollow rotary body and after the at least one first discharge opening with respect to the direction of discharge, a housing which at least partially surrounds said hollow rotary body, having a discharge area, said discharge area including discharge channels for both said first and second discharge openings, at least parts of the housing having heat insulation;

at least one of the first and second discharge openings opening into the discharge area of said housing.

15. The device of claim 14, wherein said conveyor comprises conveyor impellers.

16. The device of claim 14, wherein said conveyor comprises pump impellers.

17. The device of claim 14, wherein the hollow rotary body additionally has centrifugal sealing elements which cooperate with the housing.

18. The device of claim 14, wherein the discharge channel for the first discharge opening is designed to return the molten mass depleted of solid compounds back to original molten mass.

19. The device of claim 18, wherein said discharge area further includes at least one discharge channel adapted for discharging the molten mass enriched with solid compounds.

* * * * *